(12) United States Patent
Ellison

(10) Patent No.: US 8,439,440 B2
(45) Date of Patent: May 14, 2013

(54) VEHICLE SEAT ASSEMBLY

(75) Inventor: Terrie Ellison, Hilliard, OH (US)

(73) Assignee: Honda Motor Co., Ltd., Tokyo (JP)

( * ) Notice: Subject to any disclaimer, the term of this patent is extended or adjusted under 35 U.S.C. 154(b) by 340 days.

(21) Appl. No.: 12/870,109

(22) Filed: Aug. 27, 2010

(65) Prior Publication Data
US 2012/0049604 A1    Mar. 1, 2012

(51) Int. Cl.
*A47C 3/00*     (2006.01)
*A47C 7/02*     (2006.01)
*B60N 2/42*     (2006.01)

(52) U.S. Cl.
USPC ............ 297/284.11; 297/452.18; 297/452.27; 297/216.1

(58) Field of Classification Search ............. 297/452.18, 297/452.27, 284.11, 216.1
See application file for complete search history.

(56) References Cited

U.S. PATENT DOCUMENTS

| | | |
|---|---|---|
| 2,789,621 A | 4/1957 | Langtry et al. |
| 3,161,436 A | 12/1964 | Hood |
| 3,612,607 A | 10/1971 | Lohr |
| 3,853,352 A | 12/1974 | Ambrose |
| 3,915,493 A | 10/1975 | Brown |
| 4,236,751 A | 12/1980 | Strien |
| 4,521,057 A | 6/1985 | Varterasian et al. |
| 4,583,781 A * | 4/1986 | Hatsutta et al. .......... 297/284.11 |
| 4,583,782 A | 4/1986 | Mikuniya |
| 4,623,192 A | 11/1986 | Koide et al. |
| 4,726,086 A | 2/1988 | McEvoy |
| 4,837,881 A | 6/1989 | Kondo et al. |
| 4,854,643 A | 8/1989 | Cojocari et al. |
| 4,916,765 A | 4/1990 | Castronovo, Jr. |
| 4,930,171 A | 6/1990 | Frantz |
| 5,100,204 A * | 3/1992 | Makihara et al. ........ 297/452.65 |
| 5,189,747 A | 3/1993 | Mundy et al. |
| 5,368,368 A | 11/1994 | Fukui et al. |
| 5,400,490 A | 3/1995 | Burchi |
| 5,474,362 A | 12/1995 | Albecker, III |
| 5,542,747 A | 8/1996 | Burchi |
| 5,564,144 A | 10/1996 | Weingartner et al. |
| 5,850,645 A | 12/1998 | Ogawa et al. |
| 6,226,819 B1 | 5/2001 | Ogawa et al. |
| 6,481,801 B1 | 11/2002 | Schmale |

(Continued)

FOREIGN PATENT DOCUMENTS

| | | |
|---|---|---|
| EP | 2123507 | 11/2009 |
| FR | 2795371 | 6/1999 |

OTHER PUBLICATIONS

International Search Report and Written Opinion of PCT/US2011/027245 dated May 9, 2011.
Office Action of U.S. Appl. No. 12/722,375 dated Jun. 12, 2012.

(Continued)

*Primary Examiner* — Sarah B McPartlin
(74) *Attorney, Agent, or Firm* — Rankin, Hill & Clark LLP

(57) ABSTRACT

A vehicle seat assembly includes a seat back and a seat base extending forward from a lower end of the seat back. The seat base is formed of a first foam member extending laterally across the seat base to absorb loads and a second foam member formed over the first member to form a seating surface of the seat base. At least one plate member has one end over molded by the first foam member and a second, opposite end secured to an associated vehicle body.

21 Claims, 4 Drawing Sheets

U.S. PATENT DOCUMENTS

| | | |
|---|---|---|
| 6,511,562 B1 | 1/2003 | Coffield |
| 6,571,411 B1 | 6/2003 | Ebe |
| 6,625,830 B2 | 9/2003 | Lampel |
| 6,652,034 B1 | 11/2003 | Schramm et al. |
| 6,663,178 B2 | 12/2003 | Fourrey et al. |
| 6,755,475 B1 | 6/2004 | Tiesler et al. |
| 6,786,541 B2 | 9/2004 | Haupt et al. |
| 6,854,806 B2 | 2/2005 | Huse |
| 7,008,013 B2 | 3/2006 | Okamoto |
| 8,141,957 B2 | 3/2012 | McClung et al. |
| 2004/0245837 A1 | 12/2004 | Clifford |
| 2005/0140199 A1 | 6/2005 | Kang et al. |
| 2006/0001307 A1 | 1/2006 | Embach |
| 2007/0096534 A1 | 5/2007 | Davidson |
| 2008/0042482 A1 | 2/2008 | Weiss et al. |
| 2009/0066142 A1 | 3/2009 | Ventura et al. |
| 2009/0085384 A1 | 4/2009 | Galbreath et al. |
| 2009/0146472 A1 | 6/2009 | Galbreath et al. |

OTHER PUBLICATIONS

Office Action of U.S. Appl. No. 12/722,360 dated Apr. 13, 2012.
U.S. Appl. No. 12/722,375, filed Mar. 11, 2010 and entitled "Vehicle Seat Assembly".
U.S. Appl. No. 12/870,080, filed Aug. 27, 2010 and entitled "Vehicle Seat Assembly".
U.S. Appl. No. 12/722,360, filed Mar. 11, 2010 and entitled "Vehicle Seat Assembly".
Office Action of U.S. Appl. No. 12/870,080 dated Oct. 1, 2012.
Office Action of U.S. Appl. No. 12/722,360 dated Sep. 11, 2012.

\* cited by examiner

VEHICLE SEAT ASSEMBLY

BACKGROUND

The present disclosure generally relates to a vehicle seat assembly, and more particularly relates to a seat cushion having a rigid member anchored to a vehicle body.

Vehicle seat assemblies typically include a seat cushion fixed to a vehicle body and a seat back extending upwardly from a rearward portion of the seat cushion. In one conventional anti-submarine construction, a forward edge of the seat cushion is raised relative to the rearward edge. For example, a cross member can be provided under the forward edge to elevate it relative to a vehicle floor and the rearward edge of the seat cushion can be mounted directly to the vehicle floor. In this arrangement, the cross member, which can be formed of sheet metal, can absorb submarine loads imparted to the seat cushion during a vehicle collision event.

The seat cushion can comprise a wire frame and a foam member molded over the wire frame. It can be the wire frame of the seat cushion that is connected to the forward cross member. A rear portion of the wire frame of the seat cushion can be bolted or otherwise secured to the vehicle's floor panel or brackets mounted to the floor panel.

Some vehicle manufacturers employ an expanded polypropylene (EPP) foam member in their vehicle seat cushions. However, such seat assemblies often suffer in comfort. This is particularly a problem when minimal space is available between the rear end of the seat cushion and the vehicle body (e.g., the floor panel).

SUMMARY

An example of a vehicle seat assembly that can overcome the aforementioned shortcomings includes a seat back and a seat base extending forward from the lower end of the seat back. The seat base is formed of a first foam member extending laterally across the seat base to absorb loads and a second foam member formed over the first member to form a seating surface of the seat base. At least one plate member has one end overmolded by the first foam member and a second, opposite end secured to an associated vehicle body.

Another example of a vehicle seat assembly includes a seat base having a seat back extending upwardly therefrom. The seat base includes a first foam portion extending laterally across the seat base with a plate member connected to the first foam portion and extending therefrom toward a vehicle body component where the plate member is secured to the vehicle body component. The seat base further includes a second foam portion molded over the first foam portion and extending longitudinally therefrom toward the rear of the seat base to form a seating surface thereof.

In a further example, a method for constructing a vehicle seat assembly is provided. In the method according to this example, at least one plate member is provided for securing a laterally extending first foam member of a seat cushion to a vehicle body component. The laterally extending first foam member is over molded on a forward end of the at least one plate member. A second foam member is over molded on the first foam member to form a seating portion of the seat base.

DETAILED DESCRIPTION

Figure 1:
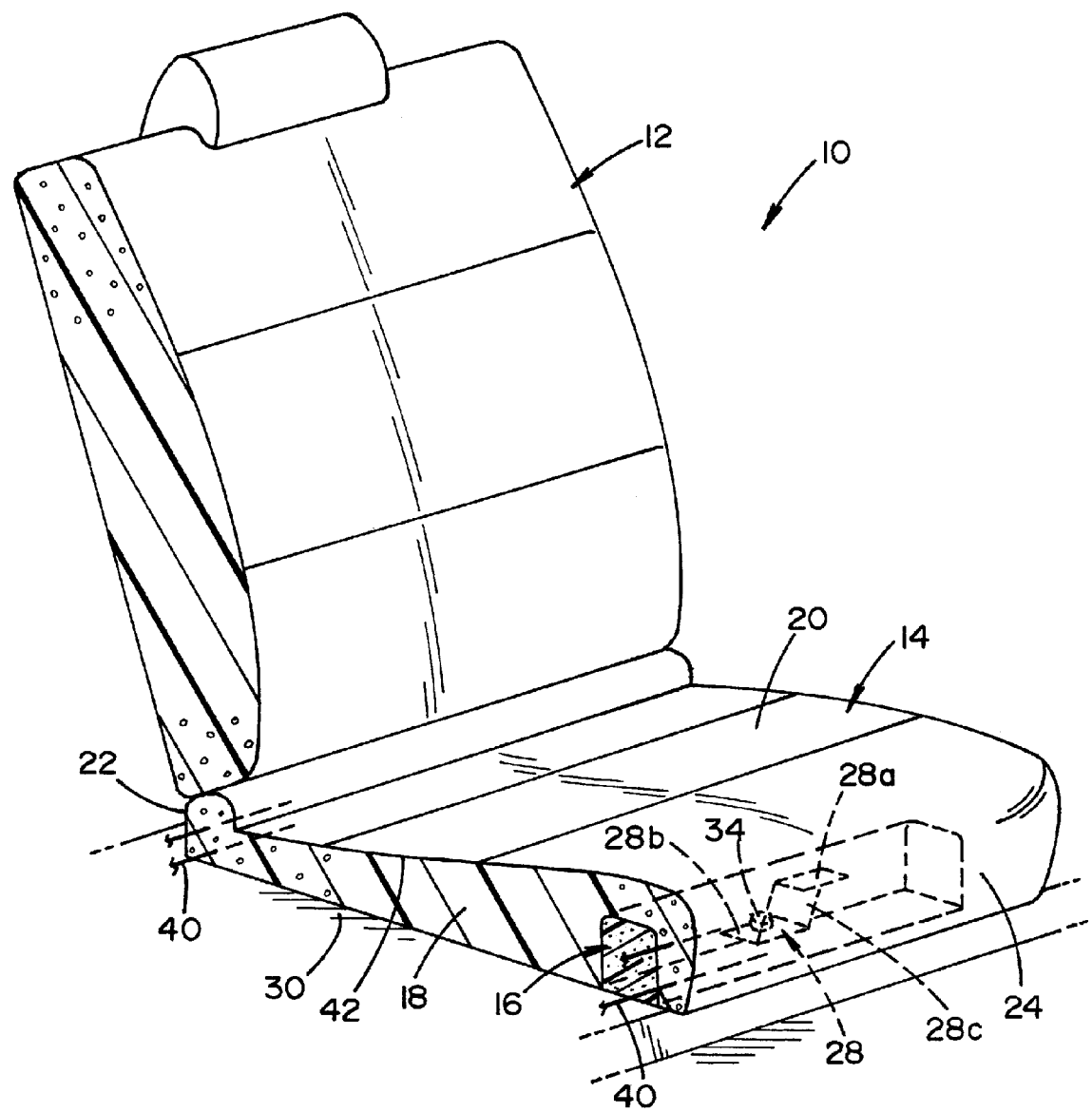
FIG. 1 is a perspective cross sectional view of a vehicle seat assembly having a first foam member extending laterally across a seat base and a second foam member formed over the first foam member.

Referring to the drawings, wherein the showings are for purposes of illustrating one or more exemplary embodiments and not for purposes of limiting same, FIG. 1 shows a vehicle seat assembly 10 including a seat back 12 and a seat base 14 extending from a lower end of the seat back 12. The seat base 14, which can also be referred to as a seat cushion, includes and is formed of a first portion or member 16 extending laterally across the seat base 14 to absorb loads (e.g., submarine loads) and a second portion or member 18 formed over the first member 16 to form a seating surface 20 of the seat base 14. In particular, the second member 18 extends longitudinally from the first member 16 toward a rear 22 of the seat base 14 to form the seating surface 20. A trim cover 42 can be received over the first and second members 16, 18, particularly over the second member 18 which is itself received over the first member 16.

In one embodiment, the first member 16 is formed of a relatively rigid material, such as a rigid foam, and the second member 18 is formed of a relatively less rigid material, such as a soft or less rigid foam. For example, the relatively rigid material of the first member 16 can be expanded polypropylene (EPP) foam and the relatively less rigid material of the second member 18 can be urethane foam. Providing the first member 16, which is formed of a more rigid material (e.g., EPP foam) along a forward portion 24 of the seat base 14 allows the first member 16 to absorb submarine loads and/or child restraint fixture loads, such as might be generated during a vehicle crash event. Providing the first member 16 only locally adjacent to the forward portion 24 allows comfort of the seat base 14 to be maintained through use of the second member 18 being formed of a less rigid material (e.g., urethane foam), while managing loads developed during a crash event.

Figure 3:
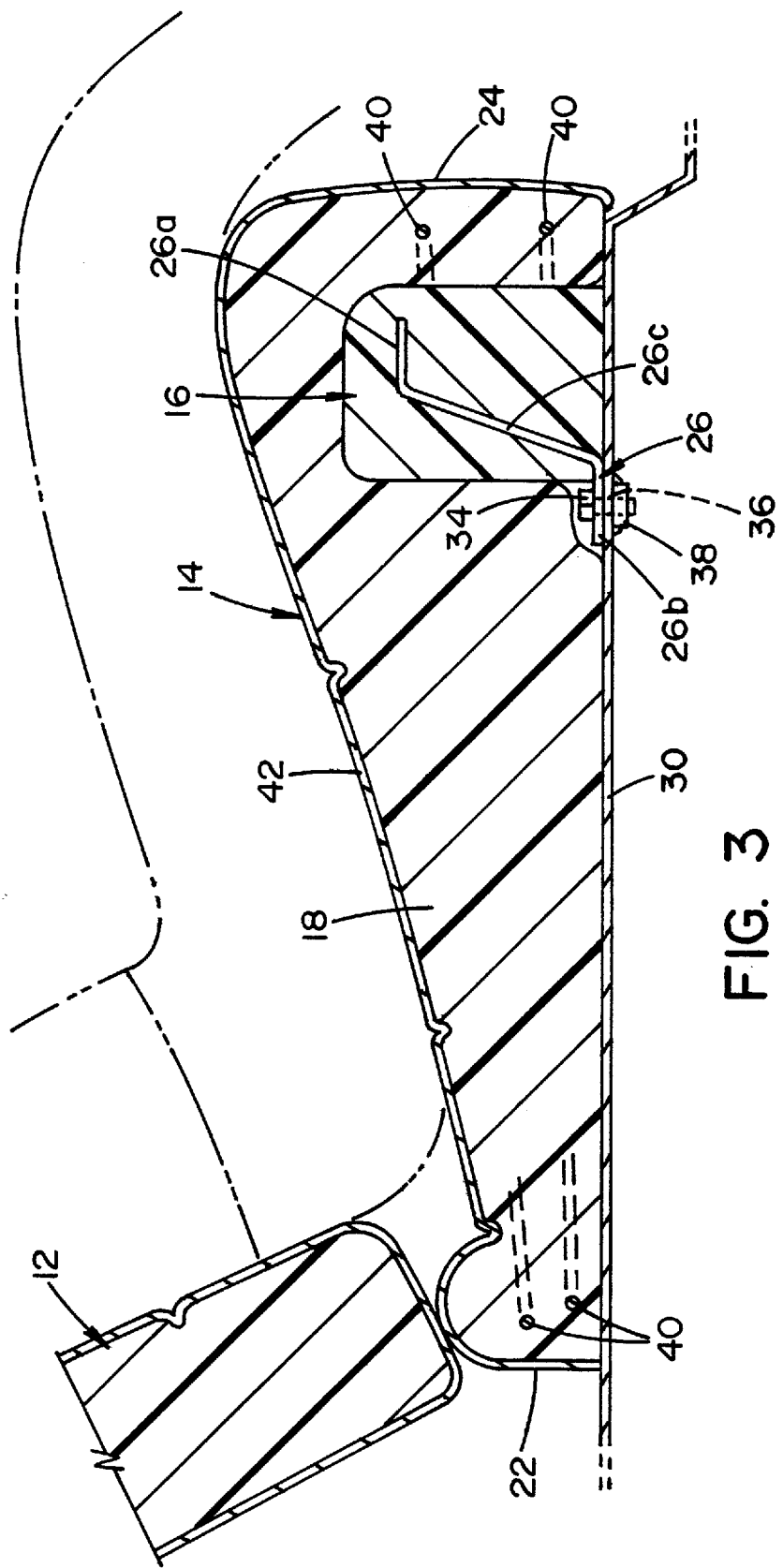
FIG. 3 is a cross sectional view of the vehicle seat assembly taken along the line 3-3 of FIG. 2.

As shown in the illustrated embodiment, the first foam member 16 can be an elongated member having a longitudinal length extending laterally across the seat base 14. In particular, the longitudinal length of the first member 16 can correspond closely to a lateral width of the seat base 14, though the first member 16 is slightly shorter. A width of the first member 16, by contrast, can be significantly smaller. For example, as best shown in FIG. 3, the width can be less than fifty percent of the front-to-back dimension of the seat base 14, preferably less than thirty-three percent of the front-to-back dimension, and more preferably approximately twenty-five percent of the front-to-back dimension. A height of the first member 16 can be such that it is nominally shorter than the seat base 14 adjacent the forward portion 24 but higher than the seat base 14 adjacent a rear 22 of the seat base 14.

In one known design (not shown), at least one wire frame section can be secured to the first foam member 16 and can extend rearwardly therefrom toward the rear 22 of the seat base 14 for mounting the seat base to an associated vehicle body (e.g., floor panel 30). In particular, each one of the at least one wire frame section can be laterally disposed at a B-location, which is located centrally along a hip point axis of the seat base 14 for assisting in transferring of submarine loads or other loads (e.g., those of a child restraint fixture) from the first member 16 to the associated vehicle body at a location adjacent the rear 22 of the seat cushion or base 14. Specifically, the at least one wire frame section can be bolted to the vehicle floor 30 adjacent the rear 22 of the seat cushion 14. In this arrangement, a metal plate can be used on top of the at least one wire section to prevent the wire frame section from slicing through the first foam member 16 during a loading condition.

One drawback of this known arrangement is that the first foam member 16 can undesirably shrink during the cooling process, particularly when the first foam member 16 is formed of EPP. As a result, when the first foam member 16 is molded over the at least one wire frame section, the shrinkage can cause the wire frame sections to distort (e.g., ends of the wire frame sections distal relative to the first foam member can converge toward one another) resulting in mounting locations for the seat cushion 14 being outside an acceptable range or tolerance and thus making cushion installation difficult. Shrinkage of the first foam member 16 can also cause the first foam member 16 itself to deform (e.g., it can bow) and thus it does not conform to its intended shape when installed in a vehicle.

Figure 2:
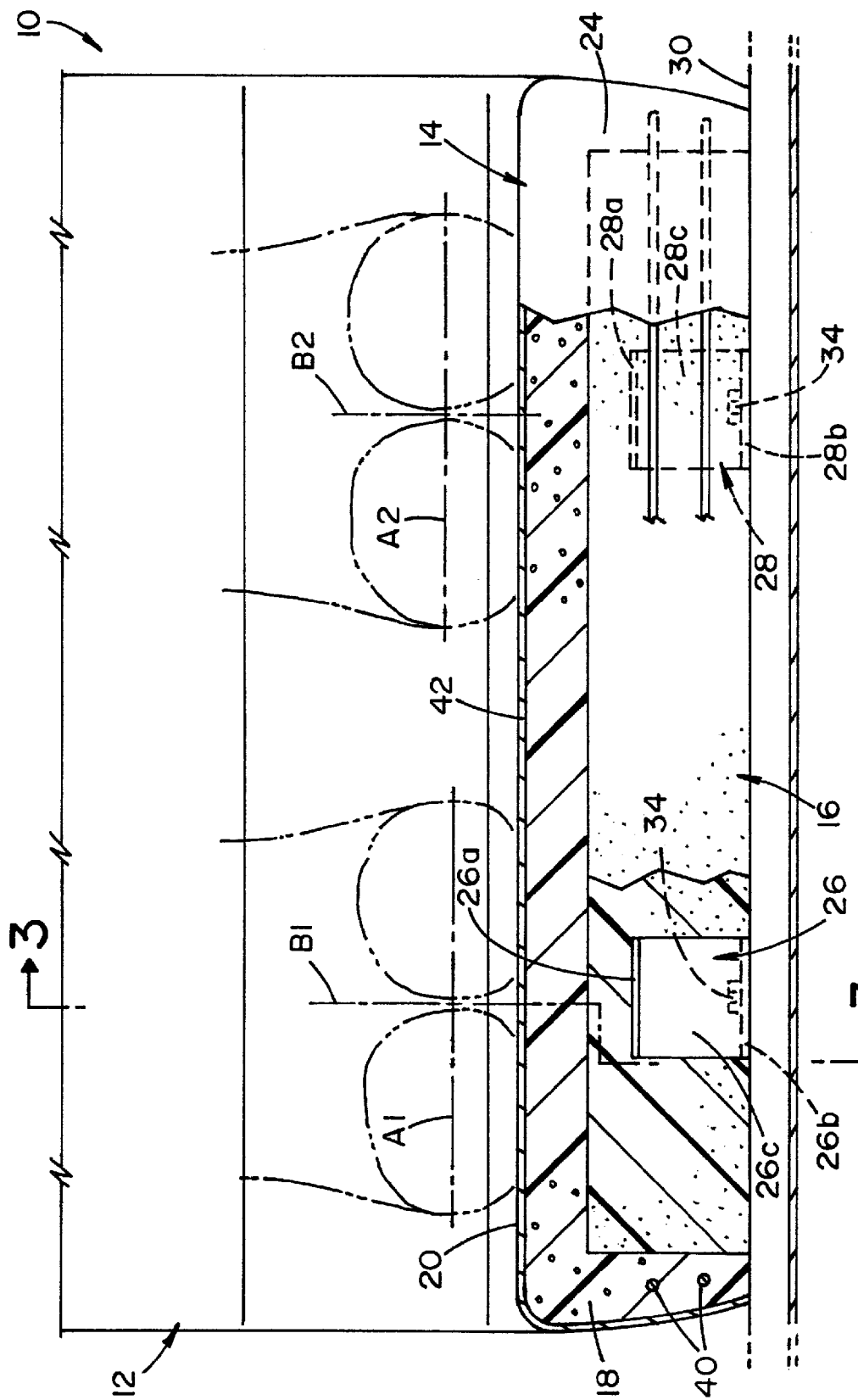
FIG. 2 is a front elevational view, partially in cross section, of the vehicle seat assembly.
Figure 4:
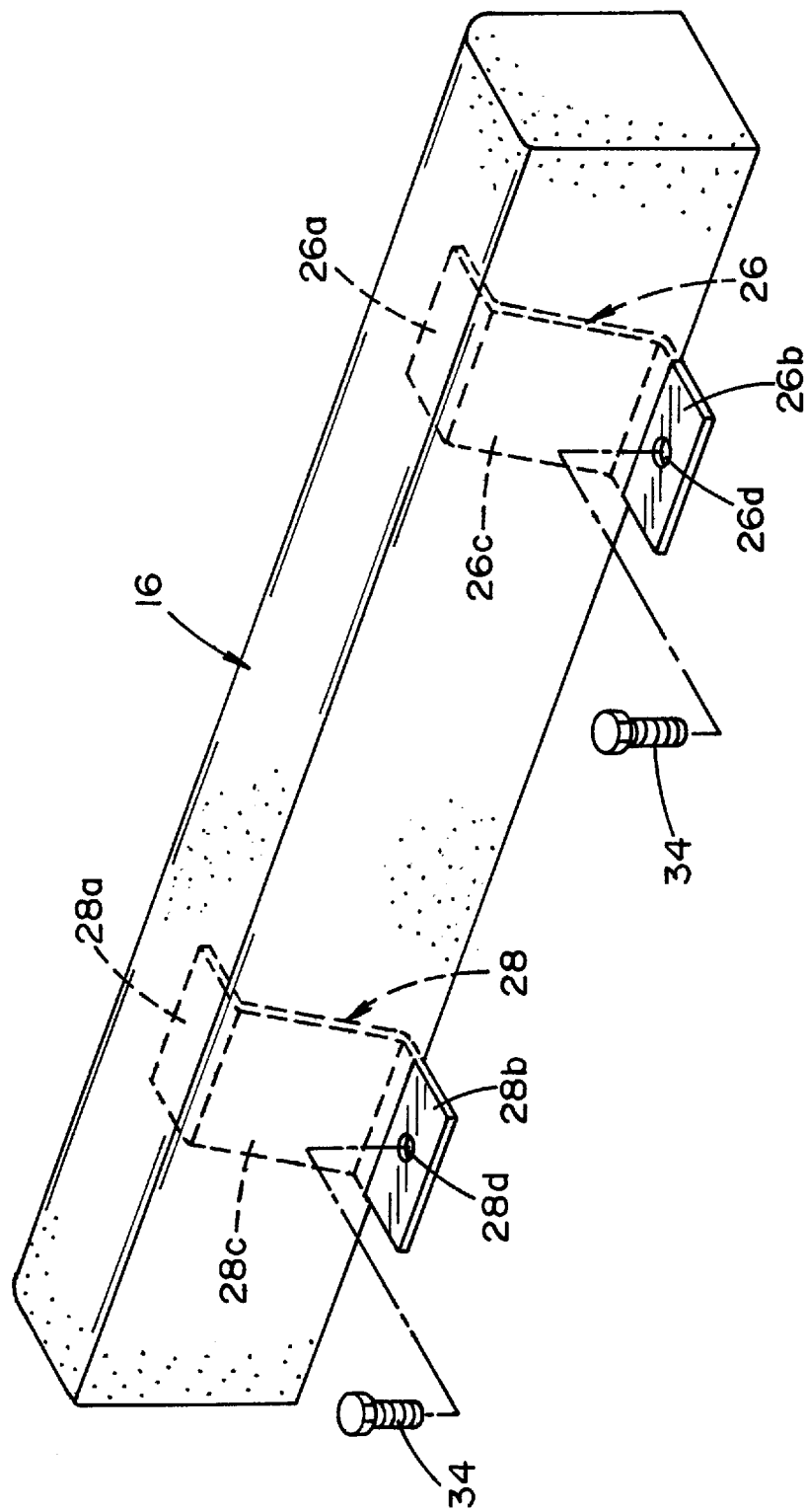
FIG. 4 is a perspective view of the first foam member and plate members having ends overmolded by the first foam member, both shown in isolation from the vehicle seat assembly.

With additional reference to FIGS. 2-4, the vehicle seat assembly 10 of the illustrated embodiment further includes at least one plate member (e.g., plate members 26 and 28) secured to the first member 16. In particular, the at least one plate member has one end overmolded by the first foam member 16 and a second, opposite end secured to the associated vehicle body (e.g., the floor panel 30). Like the wire frame sections of the known vehicle seat arrangement, each of the plate members can be laterally disposed at the B-location, which is located centrally along a hip point axis of the seat base 14. Also like the wire frame sections of the known vehicle seat arrangement, this positioning of the one or more plate members can assist in transferring submarine loads or other loads (e.g., those of a child restraint fixture) from the first member 16 to the associated vehicle body.

In the illustrated embodiment, the one or more plate members of the vehicle seat assembly 10 includes first plate member 26 and second plate member 28. Accordingly, a pair of laterally spaced apart plate members 26, 28 are provided, wherein the plate members 26, 28 have their respective first ends 26a, 28a connected to the first member 16. In particular, the first ends 26a, 28a are overmolded by the first foam member 16 for securing the plate members 26, 28 and the first member 16 together. Second, opposite ends 26b, 28b of the plate members 26, 28 can be secured to the vehicle body component (e.g., floor panel 30). In the illustrated embodiment, and similar to the wire frame sections of the above-discussed seat arrangement, the plate members, 26, 28 are each disposed centrally (i.e., at a B-location) along a respective hip point axis of the seat base 14.

More particularly, the first plate member 26 is laterally disposed at a B-location B1 of a first hip point access A1 of the seat base 14 and the second plate member 28 is laterally disposed at a B-location B2 of a second hip point axis A2 of the seat base 14. As is known and understood by those skilled in the art, each hip point axis of the seat base 14 is located at a vertical location where an expected seat occupant's hip would be located (i.e., the pivot point between the torso and upper leg portions of a seat occupant's body). As used herein, hip point axis is an axis extending in a direction laterally across the vehicle and each hip point axis has a first lateral end and a second lateral end, the distance between the first and second lateral ends being an approximate width of the expected seat occupant. As used herein, B-location is a location disposed centrally along each hip point axis (i.e., located centrally between the first and second lateral ends of each hip point axis).

While the illustrated embodiment includes two plate members 26, 28, it is to be appreciated that the seat base 14 could include only a single plate member or could include more than two plate members. For example, in a seat base designed for only one occupant, the seat base would have only a single hip point axis with a single B-location or center location defined therealong. Accordingly, only a single plate member could be used. In a seat base designed for multiple occupants, the seat base could have a hip point axis located where each occupant is expected to be seated and each hip point axis could have its own B-location or center location. In this arrangement, a plate member could be provided at each B-location. Also in the illustrated embodiment, the vehicle body or vehicle body component is illustrated as the floor panel 30; however, it is to be appreciated that the plate members 26, 28 could be secured to some other vehicle body component or to some intermediate component or bracket that is itself secured to the vehicle floor panel 30 or some other vehicle component.

As shown in the illustrated embodiment, first ends 26a, 28a of the plate members 26, 28 are overmolded by the first foam member 16 and second or rear ends 26b, 28b are secured to the vehicle body component or floor panel 30 below the seat base 14. In addition, at least in the illustrated embodiment, connecting portions 26c, 28c, which extend between respective first portions 26a, 28a and second portions 26b, 28b, can also be overmolded by the first foam member 16. In the illustrated embodiment, the first portions 26a, 28a are oriented approximately parallel to a horizontal plane, which in the illustrated embodiment is shown parallel to floor panel 30, and the second portions 26b, 28b are oriented approximately parallel to at least a portion of the associated vehicle component (floor panel 30) to which the ends 26b, 28b are secured. The connecting portions 26c, 28c extend at an angle between the first and second portions 26a, 28a and 26b, 28b. More specifically, as best shown in FIG. 3, the connection portions 26c, 28c extend at obtuse angles relative to the first and second portions 26a, 28a and 26b, 28b (i.e., the connecting portion is not orthogonally or acutely oriented relative to the first and second portions). Additionally, a section of each of the second portions 26b, 28b adjacent the connecting portions 26c, 28c can also be overmolded by the first foam member 16. By the plate members 26, 28 being overmolded by the first foam member 16, these components are connected to one another for transferring submarine loads (or other loads, e.g., child restraint device loads) absorbed by the first foam member 16 to the vehicle floor panel 30.

The second ends 26b, 28b of the plate members 26, 28 are secured to the vehicle body component, such as the floor panel 30, rearwardly adjacent the first foam portion 16. That is, the second ends 26b, 28b are secured to the associated vehicle body rearward of and adjacent to the first foam member 16. Specifically, as shown in the illustrated embodiment, the second ends 26b, 28b can be secured to the associated vehicle body immediately rearwardly of the first foam member 16. As shown, the second ends 26b, 28b define respective apertures 26d, 28d through which bolts 34 can be received. The apertures 26d, 28d can be in registry with apertures 36 defined in the vehicle body component or floor panel 30 (only one shown in FIG. 3) and a threaded member, such as nut 38, can be secured to the bolt 34 thereby connecting the plate member 26 or 28 to the floor panel 30. Of course, other connection means and devices can be used to secure the plate members 26, 28 to the vehicle body component. For example, the second ends 26b, 28b could be connected by welding, grommet-type connections, etc.

As already mentioned, the first member 16 can be overmolded onto the plate members 26, 28, particularly the first ends 26a, 28a, the connecting portions 26c, 28c and portions of the second ends 26b, 28b. The Z-shape of the plate members 26, 28 can facilitate secure attachment between the overmolded first member 16 and the plate members 26, 28. The second member 18 can be overmolded onto the first member 16.

If desired, the vehicle seat assembly 10, and particularly the seat base 14 thereof, can include wire frame section 40, which is overmolded by the second member 18. In particular, the wire frame section 40 can be provided about a perimeter of the seat cushion or base 14 and provide a structure on which to overmold the second member 18, though this is not required.

A method for constructing a vehicle seat assembly will now be described, such as the vehicle seat assembly 10 of the illustrated embodiment. First, at least one plate member is provided for securing a laterally extending first foam member of a seat cushion to a vehicle body component. In the illustrated embodiment, plate members 26, 28 are provided for securing the laterally extending first foam member 16 of the seat cushion 14 to the floor panel 30. Next, the laterally extending first foam member 16 is overmolded on a forward end of the at least one plate member. In the illustrated embodiment, the laterally extending first foam member 16 is overmolded on respective forward ends 26a, 28a of the plate members 26, 28. Then, a second foam member can be overmolded on the first foam member to form a seating portion of the seat base. In the illustrated embodiment, the second foam member 18 is overmolded on the first foam member 16 to form seating portion or surface 20 of the seat base 14. As already mentioned, the first foam member, such as first foam member 16, can be an expanded polypropylene foam and a second foam member, such as second foam member 18, can be a urethane foam. Overmolding of the first foam member 16 onto the plate members 26, 28 can include positioning the plate members 26, 28 in a lateral center of at least one hip point axis of the seat base 14.

The trim cover 42 can then be installed over the first and second members 16, 18. Next, the seat cushion 14 can then be installed in a vehicle, optionally in conjunction with the seat back 12. More specifically, the second ends 26b, 28b of the plate members 26, 28 can be secured to floor panel 30 via bolts 34 and nuts 38 or some other securing means or device.

It will be appreciated that various of the above-disclosed and other features and functions, or alternatives or varieties thereof, may be desirably combined into many other different systems or applications. Also that various presently unforeseen or unanticipated alternatives, modifications, variations or improvements therein may be subsequently made by those skilled in the art which are also intended to be encompassed by the following claims.

The invention claimed is:

1. A vehicle seat assembly, comprising:
    a seat back;
    a seat base extending forward from a lower end of said seat back, said seat base formed of a first foam member extending laterally across said seat base to absorb loads and a second foam member formed over said first member to form a seating surface of said seat base, said first foam member substantially spaced apart from a rear of said seat base and disposed only along a forward edge of said seat base; and
    at least one plate member having one end overmolded by said first foam member and a second, opposite end secured to an associated vehicle body.

2. The vehicle seat assembly of claim 1 wherein said second end is secured to the associated vehicle body below said seat base.

3. The vehicle seat assembly of claim 1 wherein said first foam member is formed of a relatively rigid material and said second foam member is formed of a relatively less rigid material.

4. The vehicle seat assembly of claim 3 wherein said relatively rigid material is expanded polypropylene foam and said relatively less rigid material is urethane foam.

5. The vehicle seat assembly of claim 1 wherein said seat base has at least one B location and said at least one plate member is laterally disposed at said at least one B-location.

6. The vehicle seat assembly of claim 5 wherein said at least one plate member includes a first plate member and a second plate member, and wherein said at least one B-location includes a first B-location and a second B-location, said first plate member laterally disposed at said first B-location and said second plate member laterally disposed at said second B-location.

7. The vehicle seat assembly of claim 1 wherein each of said at least one plate member includes a one portion formed at said first end oriented approximately parallel to a horizontal plane, a second portion formed at said second end oriented approximately parallel to at least a portion of the associated vehicle body to which said second end is secured, and a connecting portion extending at an oblique angle between said first portion and said second portion.

8. The vehicle seat assembly of claim 7 wherein the associated vehicle body is a floor panel and said second end of said at least one plate member is bolted to said floor panel.

9. The vehicle seat assembly of claim 1 wherein said second foam member is overmolded onto said first foam member.

10. The vehicle seat assembly of claim 1 further including a wire frame section overmolded by said second foam member.

11. The vehicle seat assembly of claim 1 wherein said second end is secured to the associated vehicle body rearward of and adjacent to said first foam member.

12. A vehicle seat assembly, comprising:
    a seat back;
    a seat base extending forward from a lower end of said seat back, said seat base formed of a first foam member extending laterally across said seat base to absorb loads and a second foam member formed over said first member to form a seating surface of said seat base; and
    at least one plate member having one end overmolded by said first foam member and a second, opposite end secured to an associated vehicle body, wherein said second end is secured to the associated vehicle body rearward of and adjacent to said first foam member.

13. The vehicle seat assembly of claim 12 wherein said second end is secured to the associated vehicle body immediately rearwardly of the first foam member.

14. A vehicle seat assembly, comprising:
    a seat base having a seat back extending upwardly therefrom, said seat base including a first foam portion extending laterally across said seat base with a plate member connected to said first foam portion and extending therefrom toward a vehicle body component where said plate member is secured to said vehicle body component, said seat base further including a second foam portion molded over said first foam portion and extending longitudinally from a rear side of said first foam portion toward said rear of said seat base to form a seating surface thereof.

15. The vehicle seat assembly of claim 14 wherein said first foam portion is formed of a rigid foam and said second foam portion is formed of a less rigid foam.

16. The vehicle seat assembly of claim 14 wherein said plate member has a rear end secured to said vehicle body component rearwardly adjacent said first foam portion.

17. The vehicle seat assembly of claim 14 wherein said plate member includes a first forward end overmolded by the first foam portion and a second rearward end secured to an associated vehicle component rearward of and adjacent to said first foam portion.

18. A method for constructing a vehicle seat assembly, comprising:
    providing at least one plate member for securing a laterally extending first foam member of a seat cushion to a vehicle body component;
    overmolding said laterally extending first foam member on a forward end of said at least one plate member such that a rearward end of said at least one plate member extends from said first foam member for mounting to the vehicle body component; and
    overmolding a second foam member on said first foam member to form a seating portion of said seat base.

19. The method of claim 18 wherein said first foam member is an expanded polypropylene foam and said second foam member is a urethane foam.

20. The method of claim 18 wherein said overmolding of said first foam member includes positioning said at least one plate at a B-location of said seat base.

21. The method of claim 18 further including:
    securing a second end of said at least one plate member to the vehicle body component rearward of and adjacent to said first foam member.

* * * * *